(12) United States Patent
Ataman

(10) Patent No.: US 9,976,542 B2
(45) Date of Patent: May 22, 2018

(54) LINEAR TELESCOPIC ACTUATOR

(71) Applicant: SAFRAN LANDING SYSTEMS CANADA INC., Ajax (CA)

(72) Inventor: Gary Ataman, Whitby (CA)

(73) Assignee: SAFRAN LANDING SYSTEMS CANADA INC., Ontario (CA)

( * ) Notice: Subject to any disclaimer, the term of this patent is extended or adjusted under 35 U.S.C. 154(b) by 94 days.

(21) Appl. No.: 15/245,386

(22) Filed: Aug. 24, 2016

(65) Prior Publication Data
US 2017/0058872 A1   Mar. 2, 2017

(30) Foreign Application Priority Data

Aug. 27, 2015  (FR) ...................................... 15 57960

(51) Int. Cl.
| | |
|---|---|
| *F16F 9/42* | (2006.01) |
| *F03G 1/10* | (2006.01) |
| *F15B 15/14* | (2006.01) |
| *F16F 9/32* | (2006.01) |

(52) U.S. Cl.
CPC ............ *F03G 1/10* (2013.01); *F15B 15/1438* (2013.01); *F15B 15/1442* (2013.01); *F16F 9/3242* (2013.01); *F03G 2730/02* (2013.01); *F16F 2226/041* (2013.01); *F16F 2226/044* (2013.01)

(58) Field of Classification Search
CPC .. F16F 9/02; F16F 9/0209; F16F 9/062; F16F 9/092; F16F 9/346; F16F 9/42
USPC ... 188/282.6, 284–288, 300, 322.16–322.18; 267/120
See application file for complete search history.

(56) References Cited

U.S. PATENT DOCUMENTS

| | | | | | |
|---|---|---|---|---|---|
| 4,066,279 | A | * | 1/1978 | Kaptanis .................. | E05F 3/02 |
| | | | | | 188/288 |
| 5,172,794 | A | * | 12/1992 | Ward ...................... | F16F 9/092 |
| | | | | | 188/282.8 |
| 5,797,593 | A | * | 8/1998 | Oyaizu ................. | F16F 9/3465 |
| | | | | | 188/322.17 |
| 5,823,512 | A | * | 10/1998 | Oyaizu ................. | F16F 9/0218 |
| | | | | | 188/322.17 |

(Continued)

FOREIGN PATENT DOCUMENTS

FR   2 596 835 A1   10/1987

OTHER PUBLICATIONS

French Preliminary Search Report for FR 15 57960 dated Jul. 22, 2016.

*Primary Examiner* — Christopher P Schwartz
(74) *Attorney, Agent, or Firm* — Sughrue Mion, PLLC

(57) ABSTRACT

A linear telescopic actuator (1) that comprises a cylinder (2), a sliding part (3), a spring seat (4) and a first compression spring (5) capable of resiliently opposing the sliding part (3) approaching the spring seat (4). The spring seat (4) presents an outer annular groove (6) and the cylinder (2) includes an inner annular groove (7). The actuator (1) also presents a blocking part (8), the actuator (1) being adapted to adopt selectively an assembled configuration and a disassembled configuration. The blocking part (8) in the assembled configuration is engaged inside the inner and outer annular grooves (6, 7). The blocking part (8) in the disassembled configuration being disengaged from one of the grooves so as to allow spring seat (4) to slide in the cylinder (2).

10 Claims, 3 Drawing Sheets

(56) References Cited

U.S. PATENT DOCUMENTS

| | | | | |
|---|---|---|---|---|
| 5,961,102 A | * | 10/1999 | Oyaizu | F16F 9/0209 188/300 |
| 6,135,434 A | * | 10/2000 | Marking | F16F 9/062 188/315 |
| 6,263,779 B1 | | 7/2001 | Oliver et al. | |
| 6,776,269 B1 | * | 8/2004 | Schel | F16F 9/346 188/284 |
| 2006/0231991 A1 | | 10/2006 | Chun et al. | |

* cited by examiner

LINEAR TELESCOPIC ACTUATOR

BACKGROUND OF THE INVENTION

The invention relates to the field of linear telescopic actuators having a sliding part that slides inside a cylinder, together with at least one spring capable of resiliently opposing said sliding part approaching a spring seat.

More precisely, the invention relates to a linear telescopic actuator comprising:
a cylinder;
a sliding part extending at least in part inside the cylinder in order to slide therein along a sliding axis;
a spring seat that is arranged at least in part inside the cylinder; and
at least a first compression spring arranged inside the cylinder between said sliding part and the spring seat in order to be capable of resiliently opposing the sliding part approaching the spring seat.

In order to enable the actuator to operate correctly, the spring seat needs to be fastened relative to the cylinder in a manner that is sufficiently secure to enable it to act via the spring to exert a resilient force opposing the sliding part approaching the spring seat.

OBJECT OF THE INVENTION

An object of the present invention is to provide a linear actuator of the above-defined type while enabling the spring seat to be assembled in simplified manner relative to the cylinder of the actuator.

SUMMARY OF THE INVENTION

To this end, the invention provides a linear telescopic actuator of the above-specified type that is essentially characterized in that the spring seat presents an outer annular groove and the cylinder includes an inner annular groove, the actuator further presenting a blocking part, the actuator being adapted to adopt selectively an assembled configuration and a disassembled configuration, the blocking part in the assembled configuration being engaged inside the inner and outer annular grooves and forming an obstacle opposing sliding of the spring seat relative to the cylinder, and the blocking part in the disassembled configuration being disengaged from at least one of the inner and outer annular grooves in order to allow the spring seat to slide relative to the cylinder, the blocking part and the inner and outer annular grooves being adapted:
A) to allow the actuator to pass from its assembled configuration to its disassembled configuration when a first force is exerted on the spring seat along said sliding axis in a first direction going from the spring seat towards the spring, this first force presenting a first magnitude greater than a predetermined minimum threshold; and
B) to prevent the actuator from passing from its assembled configuration to its disassembled configuration:
when a force is exerted on the spring seat in said first direction with a magnitude less than or equal to the predetermined minimum threshold; or
when a force is exerted on the spring seat in a second direction opposite to said first direction.

Because of the particular arrangement of the blocking part, of the inner annular groove made inside the cylinder, and of the outer annular groove made around the spring seat, the blocking part forms an obstacle to sliding and/or movement of the spring seat inserted inside the cylinder.

In other words, this particular arrangement is such that the only way to cause the blocking part to be disengaged from one of the grooves so as to allow the seat to slide relative to the cylinder is to apply the first force directed in the first direction, i.e. going from the spring seat towards the spring. If thrust is exerted on the spring seat relative to the cylinder, with the thrust going in the second direction, i.e. from the spring towards the spring seat, or with the thrust going in the first direction, but being of a magnitude less than or equal to the predetermined minimum threshold, the actuator remains in its assembled configuration.

The predetermined minimum threshold is used to secure the assembly and to prevent disassembly when the force exerted in the first direction is of too small a magnitude. Ideally, the blocking part is dimensioned together with the inner and outer annular grooves so that the predetermined minimum threshold corresponds to a large force generated by a specific disassembly tool.

The blocking part is spring loaded so that the minimum threshold needed for causing the disassembling of the actuator is superior to the normal G forces or hydraulic forces applied on the spring seat while the actuator is used under predetermined normal conditions.

Thanks to the invention, even when the springs fail, the spring seat remains assembled and resists to said normal G forces or hydraulic forces.

In some applications, this predetermined minimum threshold needed for causing the actuator to pass from the assembled configuration to the disassembled configuration may be set to lie in the range 400 newtons (N) to 4500 N.

Likewise, the grooves and the blocking part may be dimensioned so that the force (also named first force F1) in the second direction that is exerted to enable the actuator to pass from its assembled configuration to its disassembled configuration is of magnitude lying in the range 400 N to 4500 N.

The invention thus enables the spring seat and the cylinder to be assembled together in simple and secure manner. Since the assembly requires few parts, i.e. only one blocking part, the spring seat, and the cylinder, it also leads to a non-negligible reduction in weight and cost.

In a particular embodiment of the telescopic linear actuator of the invention, the blocking part is an open resilient ring that is adapted under the action of said first force to disengage from the outer annular groove of the spring seat by moving towards the inside of the inner annular groove of the cylinder in such a manner as to allow the spring seat to move relative to said cylinder in said first direction.

The use of such a resilient ring makes it possible to spread the forces associated with assembly between the spring seat and the cylinder over a long length of the outer annular groove of the seat and over a long length of the inner annular groove of the cylinder. This limits phenomena of the blocking part being over stressed since the forces it needs to withstand are spread over the entire length of the ring inserted in these grooves. Typically, the assembly is designed to be capable of being subjected to at least ten assembly and disassembly operations.

In a particular embodiment of the actuator of the invention, the outer annular groove of the spring seat presents first and second shoulders arranged to be on either side of the blocking part when the actuator is in the assembled configuration. The first shoulder is arranged to oppose any movement of the seat relative to the cylinder in the first direction, and the second shoulder is arranged to oppose any movement of the seat relative to the cylinder in the second direction, the outer annular groove of the spring seat presenting:

a first outer radius of length R1 measured at its first shoulder; and a minimum outer radius of length Rmin measured between the first and second shoulders;

the inner annular groove of the cylinder, the outer annular groove of the seat, and the blocking part being dimensioned so that then the actuator is in the assembled configuration, the blocking part is spaced apart from the bottom of the inner annular groove of the cylinder by a distance Dx greater than the difference R1−Rmin.

Since the distance Dx between the bottom of the inner annular groove of the cylinder and the blocking part is selected to be greater than the difference R1−Rmin, it is certain that while the seat is sliding relative to the cylinder in the first direction, the blocking part always remains spaced apart from the bottom of the inner annular groove of the cylinder. This reduces any risk of the sliding of the seat relative to the cylinder being blocked when the blocking part is facing the first shoulder of radius R1 and the actuator is in the assembled configuration.

This ensures that causing the actuator to pass from its assembled configuration to its disassembled configuration is made secure.

Ideally, the blocking part is in the form of an open ring that is circular in section when observed in a radial section plane, the circular section being uniform over a major portion of the length of the open ring and presenting a radius R3, the outer annular groove of the spring seat presenting a second outer radius of length R2 measured at its second shoulder, the radius R3 being less than or equal to the difference R2−Rmin.

In this way, when the seat is forced in the second travel direction while the blocking part in the form of an open resilient ring is pressed against the bottom of the outer annular groove of the seat, an edge of the inner annular groove of the cylinder necessarily comes to bear against a portion of the blocking part so as to urge it radially towards the spring seat and thus oppose any movement of the seat relative to the cylinder in the second direction. The greater the level of force exerted to urge the seat in this second direction, the greater the force with which the blocking part is clamped radially and concentrically against the outer groove of the seat. This prevents any extraction of the seat from the cylinder when the seat is thrust in the second direction.

In a particular embodiment of the telescopic linear actuator of the invention, it is possible to ensure that the blocking part of open ring shape is resilient so as to exert a resilient force against the outer annular groove of the spring seat opposing any passage of the actuator from its assembled configuration to its disassembled configuration.

In other words, when the actuator is in the assembled configuration and the seat is urged in the first direction relative to the cylinder, the open resilient ring is pressed against the bottom of the outer annular groove of the seat. The ring then exerts a resilient force against the outer annular groove of the seat in order to force the ring to return to the bottom of the groove and consequently hold the actuator in the assembled configuration.

The invention also provides an aircraft including an actuator according to any of the embodiments of the invention.

BRIEF DESCRIPTION OF THE DRAWINGS

Other characteristics and advantages of the invention appear clearly from the following description made by way of non-limiting indication and with reference to the accompanying drawings, in which.

DETAILED DESCRIPTION OF THE INVENTION

As indicated above, the invention relates to a linear telescopic actuator 1 of the telescopic linear hydraulic actuator type.

Figure 1:
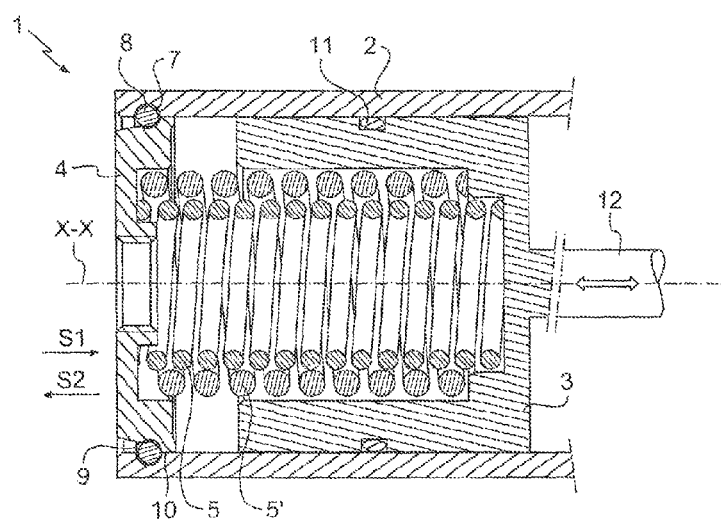
FIG. 1 is a longitudinal section view of a portion of a linear telescopic actuator of the invention.

As shown in FIG. 1, the actuator 1 of the invention comprises:
- a hollow cylinder 2 presenting a right cylindrical inside surface of axis of symmetry X-X;
- a sliding part 3 extending at least partially inside the cylinder 2 in order to slide therein along the sliding axis X-X like a piston in a cylinder;
- a spring seat 4 that is arranged at least in part inside the cylinder 2; and
- at least a first compression spring 5, specifically first and second compression springs 5 and 5' arranged inside the cylinder 2, between said sliding part 3 and the spring seat 4 in order to resiliently oppose said sliding part 3 approaching the spring seat 4.

The springs 5 and 5' are compression springs, preferably coil springs and preferably cylindrical. These springs 5 and 5 are arranged coaxially, the first spring 5 being placed inside the second spring 5'. The first spring 5 is a right-handed spring while the second spring 5' is a left-handed spring, thereby limiting any risk of the turns of the springs 5 and 5' overlapping.

The cylinder 2 and the sliding part 3 are bodies of revolution that are symmetrical about the sliding axis X-X. An annular gasket 11, of the O-ring type, extends around the sliding part 3 between the part 3 and the cylinder 2 so that the part 3 can slide in leaktight manner inside the cylinder 2 along the axis X-X.

Thus, at one end of the sliding part 3 there is a chamber that can be put under pressure by means of a hydraulic fluid in order to cause the part 3 to move inside the cylinder 2. A rod 12 of the telescopic actuator extends from the sliding part 3 in order to transmit mechanical forces between the part 3 and a system that is external to the cylinder.

The spring seat 4 presents an outer annular groove 6, and the cylinder 2 includes an inner annular groove 7, each of these two grooves being symmetrical about the axis X-X.

These outer and inner annular grooves 6 and 7 are formed so as to be capable of being placed facing each other when the spring seat 4 is placed in the cylinder 2 with the actuator 1 in the assembled configuration.

The actuator 1 also presents a blocking part 8 enabling the seat 4 and the cylinder 2 to be selectively assembled together via their respective grooves 6 and 7.

Figures 2A, 2B, 2C, 2D, 2E, 2F:
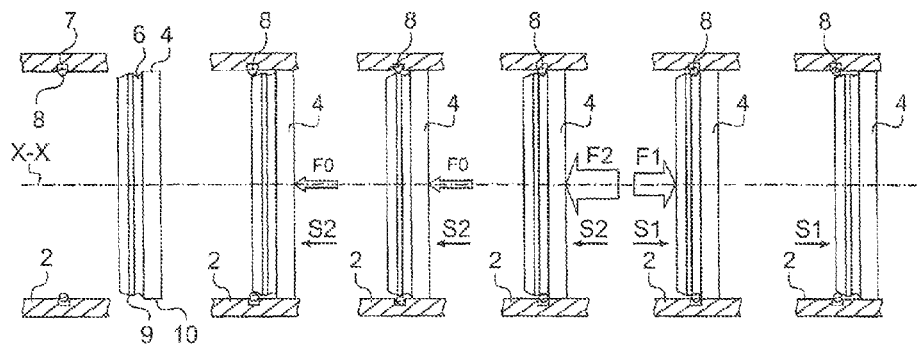
FIGS. 2a, 2b, 2c, and 2d show steps in assembling the spring seat facing the cylinder of the actuator of the invention, and they also show the forces F0, F1, F2 applied to the spring seat at each of these assembly steps.
FIGS. 2e and 2f show steps of disassembling the spring seat from the cylinder of the actuator of the invention, together with the forces applied to the spring seat at each of these disassembly steps.
Figures 3A, 3B, 3C, 3D, 3E:
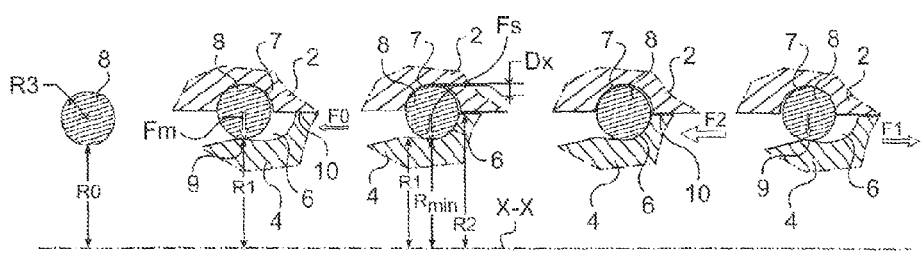
FIG. 3a is a radial section view of a resilient ring-shaped blocking part before it is used for assembling the spring seat in the cylinder of the actuator of the invention, at this stage, the resilient ring shaped blocking part is at rest and presents an inner radius R0.
FIG. 3b shows the same resilient ring-shaped part in radial section view during assembly step 2c, i.e. at the moment when the blocking part is facing one of the groove shoulders of the spring seat, a thrust force F0 is directed on the second direction and exerted on the spring seat so as to insert the blocking part in the outer annular groove of the spring seat.
FIG. 3c shows the blocking part in radial section view during assembly step 2d, i.e. at the moment when the blocking part is inserted in the outer annular groove of the spring seat and in the inner annular groove of the cylinder, the linear actuator of the invention thus being assembled.
FIG. 3d shows the blocking part in radial section receiving a thrust force F2 exerted by the spring on the spring seat during operation of the linear actuator of the invention.
FIG. 3e shows the blocking part subjected to a disassembly force F1 directed in a first direction and exerted the actuator seat, the blocking part being resiliently enlarged to pass the first shoulder of the outer annular groove of the spring seat.
Figure 4:
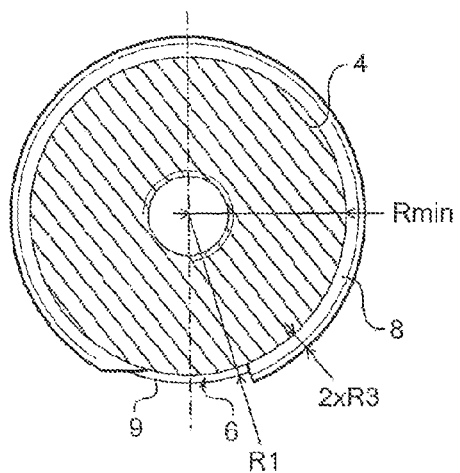
FIG. 4 is a cross-section view of the spring seat in a plane containing the bottom of the outer annular groove against which the blocking part in the form of an open ring exerts concentric resilient clamping.

The actuator 1 selectively adopts an assembled configuration as shown in FIGS. 1, 2d, 2e, and 3c, or a disassembled configuration as shown in FIG. 2a.

In the assembled configuration, the blocking part 8 is engaged inside the inner annular groove 6 and inside the outer annular groove 7, and it thus forms an obstacle opposing sliding of the spring seat 4 relative to the cylinder 2.

In the disassembled configuration, as shown in FIG. 2a, the blocking part 8 is disengaged from the outer annular groove 6 of the seat and it is then possible for the spring seat 4 to slide relative to the cylinder 2.

As can be seen in particular in FIGS. 2e and 2f, the blocking part 8 and the inner and outer annular grooves 7 and 6 are shaped so as to allow the actuator 1 to pass from its assembled configuration to its disassembled configuration when a first force F1 is exerted on the spring seat 4 along the sliding axis X-X and in a first direction S1 going from the spring seat 4 towards the spring 5. This first force F1 presents a first magnitude greater that a predetermined minimum threshold. The value selected for the predetermined minimum threshold depends on the type of forces to which the actuator is to be subjected during normal use of the actuator during which it is desired to avoid any risk of the actuator becoming disassembled. Typically, this threshold is selected to withstand the accelerations to which the actuator is normally subjected when it is on board a vehicle such as an aircraft, and also to withstand the normal pressure variations to which the actuator is subjected.

The blocking part 8 and the inner and outer annular grooves 7 and 6 are also shaped so as to prevent the actuator passing from its assembled configuration to its disassembled configuration:
- when a force is exerted on the spring seat 4 in said first direction S1 with a magnitude that is less than or equal to the previous predetermined minimum threshold; and also
- when a force F2 is exerted on the spring seat 4 in the second direction S2 opposite to the first direction S1.

By means of this particular arrangement of the invention, it can be seen that in reaction to a thrust force on the seat relative to the cylinder that is directed in a first direction S1, the blocking part 8:
- remains inserted simultaneously in the inner and outer annular grooves 7 and 6 so long as the thrust force presents a magnitude that is less than or equal to a predetermined minimum threshold, thus preventing the seat 4 from sliding relative to the cylinder 2; and
- becomes disengaged from the outer cylinder 4 by sliding towards the other groove 7 as soon as this thrust force directed along the first direction S1 becomes greater than the predetermined non-zero minimum threshold, i.e. if the force is a force F1.

The thrust force F1 needed for allowing the actuator to pass from the assembled configuration to the disassembled configuration is referred to as the "first" force F1. The spring seat, the outer annular groove and the blocking part 8 are designed so that the first force F1 can be generated using a simple hand operator puller tool 20.

So long as the first force F1 is not applied to the spring seat 4, the spring seat remains assembled with the cylinder 2. Thus, in the event of the compression springs 5 and 5' breaking, so long as this first force F1 is not exerted, the spring seat 4 remains assembled relative to the cylinder 2 and it continues to be prevented from sliding relative to the cylinder 2.

This limits any risk of the spring seat becoming disassembled accidentally and any risk of pieces of the springs 5, 5' being spread outside the cylinder 2.

Because of this particular arrangement, it can be seen that in reaction to a thrust force on the seat relative to the cylinder that is directed in a second direction S2 opposite to the first direction S1, i.e. going from the spring 5 towards the spring seat 4, the blocking part 8 remains engaged inside the inner and outer grooves and prevents the spring seat from sliding along the second direction S2 relative to the cylinder. The actuator 1 is thus maintained in the assembled configuration. Exerting a force, even a minimal force, on the spring seat directed in the second direction S2, thus opposes this disassembly of the spring seat from the cylinder. It should be observed that on the sliding part 3 approaching the spring seat, the compression springs 5 and 5' become compressed and generate a resilient force F2 against the spring seat 4 that may be much greater in magnitude than the disassembly force F1. Even if F2 is very large compared with F1, it can be seen that the assembly between the seat and the cylinder withstands this force since F2 is directed in the second direction S2. It should be noted that the profile of the spring seat is chosen so as to have F0<F1<F2.

It should be observed that the force exerted on the spring seat at a given instant is the sum of all of the force vectors parallel to the axis X-X and applied to the seat at that given instant. Thus, even if both springs 5 and 5' apply a resilient thrust force on the seat 4 in the second direction S2 while a thrust force is also being exerted on the seat 4 along the first direction S1, before the first force F1 can allow the actuator to pass from its assembled configuration to its disassembled configuration, it is necessary for the sum of the force vectors exerted on the seat (parallel to the axis X-X) to form an overall force F1 that is directed in the first direction and that presents a magnitude greater than the predetermined minimum threshold.

It should be observed that even in the event of the spring(s) breaking, there is very high probability that there is at least a portion of the springs 5 and 5' that exerts a thrust force on the spring seat 4 in the second direction S2. Thus, even in the event of a spring breaking, the blocking part remains partially within the inner annular groove 7 and partially within the annular outer groove 6, thereby holding the spring seat firmly assembled inside the cylinder and preventing the actuator passing from the assembled configuration to the disassembled configuration.

In order to perform these functions, the blocking part 8 is an open resilient ring. The outer annular groove 6 of the spring seat 4 presents first and second shoulders 9 and 10 arranged on either side of the blocking part 8 when the actuator 1 is in the assembled configuration.

As shown in particular in FIGS. 3c, 4, 5, and 6, the first shoulder 9 opposes any movement of the spring seat 4 relative to the cylinder 2 in the first direction S1. The second shoulder 10 opposes any movement of the spring seat 4 relative to the cylinder 2 in the second direction S2.

The outer annular groove 6 of the spring seat 4 presents:
a first outer radius of length R1 measured at the first shoulder 9; and
a minimum outer radius of length Rmin measured between the first and second shoulders 9 and 10.

It should be noted that said inner radius R0 of the resilient ring shaped blocking part 8 at rest is defined so as to have R0<Rmin<R1<R2. As a consequence, when resilient ring 8 surrounds the first shoulder 9, it exerts on the shoulder a radial force Fm which is superior to the radial force Fs exerted by the resilient ring 8 when it surrounds the outer annular groove 6.

Therefore, the resilient ring 8 tends to move along the spring seat 4 from the shoulder 9 to the groove 6 and tends to remain in groove 6.

Blocking part 8 is designed to be spring loaded to keep the spring seat 4 in assembled position:
even under dual failure condition of both springs 5, 5', that is to say when none of the springs apply an elastic force against the seat 4; and
even when the spring seat 4 is pushed in the first direction S1 under a working force inferior to F1, said force F1 is designed so as to be higher than normal g forces and hydraulic flow forces acting on the spring seat.

The blocking part 8 is in the form of an open ring that, when observed in a radial section plane, as in all of the figures, is of section that is circular, and that is uniform over a major portion of the length of the ring. This uniform circular section is of radius R3.

The inner annular groove 7 of the cylinder 2 is of semicircular radial section of radius R4 greater than or equal to the radius R3 in order to allow the ring to slide in the groove 7 on assembly. This radius 4 is tailorable to vary the de-dent force to engage and disengage the spring seat 4.

Figure 6:
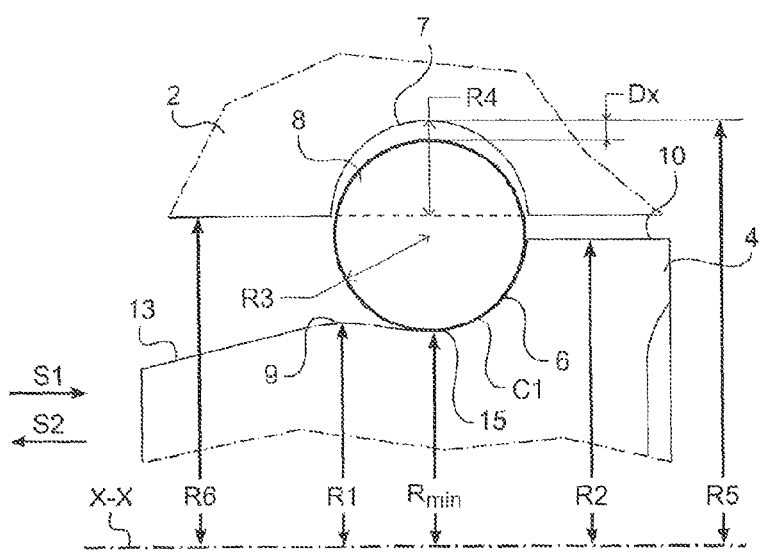
FIG. 6 is a section view of a portion of the actuator of the invention in the radial plane of the blocking part in the form of a resilient ring, this figure showing the relative dimensions of the spring seat, of the inner and outer annular grooves, and of the blocking part placed in those grooves in order to hold the actuator in its assembled configuration.

The outer annular groove 6 of the spring seat 4 and the blocking part 8 are of dimensions such that when the actuator 1 is in the assembled configuration, as shown in FIG. 6, the blocking part 8 remains spaced part from the bottom of the inner annular groove 7 by a distance Dx greater than the difference R1–Rmin.

The outer annular groove 6 of the spring seat 4 presents a second outer radius of length R2 measured at its second shoulder 10, the radius R3 being less than or equal to the difference R2–Rmin. This makes it possible to force the blocking part 8 to become wedged in the outer groove 6 when the seat 4 is pushed in the direction S2.

Between the bottom of the groove and the second shoulder 10, the outer annular groove 6 is shaped to present a chamfer C1 of shape complementary to the profile of the blocking part 8 in order to provide a continuous bearing surface between the blocking part and the chamfer over the entire length of the blocking part 8. Specifically, since the blocking part 8 is of cylindrical radial section, the portion of the outer annular groove that extends between the bottom of the groove 6 and the second shoulder 10 is constituted by a chamber C1 of circular profile and of radius identical to the radius R3 of the blocking part seen in radial section.

One end of the spring seat 4 presents a conical annular chamfer 13 designed to guide the blocking part 8 around the seat 4 during insertion of the seat 4 into the resilient ring 8 that is already engaged in the inner annular groove 7 of the cylinder 2.

Figure 5:
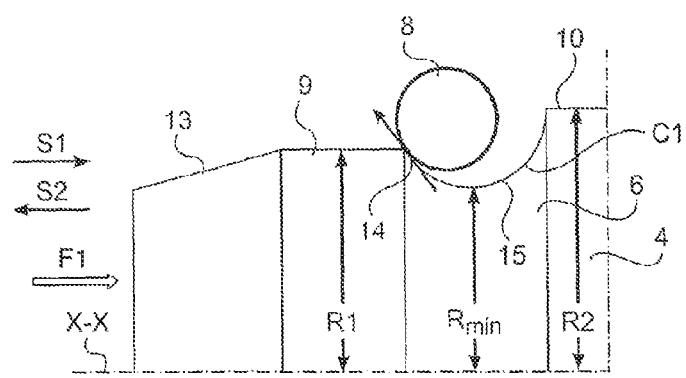
FIG. 5 is a diagrammatic radial section view of the blocking part at the moment the spring seat is disassembled from the cylinder, disassembly being caused under the effect of a thrust F1 directed in a first direction, the blocking part then generating a resilient force against the first shoulder that opposes extraction of the blocking part from the outer annular groove of the spring seat.

In the embodiment of FIG. 5, the flare angle of the chamfer 13 is less than the maximum flare angle of the chamfer 14 of the groove 6 between the bottom 15 of the groove 6 and the shoulder 9. In this way, the magnitude of the thrust in the direction S2 that is needed to cause the actuator to pass from a disassembled configuration to its assembled configuration is less than the magnitude of the first force F1 that is necessary to cause the actuator to pass from its assembled configuration to its disassembled configuration. It should be observed that in the disassembled configuration, the blocking part 8 extends in the inner annular groove 7 of the cylinder 2 and is placed outside the outer annular groove 6 of the spring seat 4, the spring seat 4 then being spaced apart from the blocking part 8.

In other words, a first end of the spring seat 4 presents a first annular chamfer 13 designed to guide the blocking part 8 in the form of an open ring around the spring seat 4 while said spring seat 4 is displaced so as to bring the blocking part 8 closer to the outer annular groove 6 of the spring seat 4 while the blocking part 8 is in contact with the first annular chamfer 13. The first annular chamfer 13 and the blocking part 8 are designed so that the displacement of the spring seat 4 so as to bring the blocking part 8 closer to the outer annular groove 6 of the spring seat 4 can be achieved by applying an axial displacement force F0 on the spring seat 4 which is inferior to 200 Newton.

The flare angle of the first chamfer 13 is tailorable to vary the force F0 necessary to engage the blocking part 8 and perform assembly. More specifically the flare angle is defined so as to perform the assembly with a small human assembly force F0. Typically, a small human assembly force is a force inferior to 200 Newton.

A side of the annular grove 6 adjacent to the first annular chamfer 13 is formed by a second annular chamfer 14. This second annular chamfer 14 is designed to guide the blocking part 8 in the form of an open ring around the spring seat 4 while said spring seat 4 is displaced so as to move the blocking part 8 away from the outer annular groove 6 of the spring seat 4 while the blocking part 8 is in contact with said second annular chamfer 14.

The second annular chamfer 14 an the blocking part 8 are designed so that the displacement of the spring seat 4 so as to move the blocking part 8 away from the outer annular groove 6 of the spring seat 4 can be achieved by exerting said first force F1 on the spring seat 4 along said sliding axis X-X in a first direction S1.

The flare angle of the second chamfer 14 is tailorable to vary the force F1 necessary to disengage the blocking part 8 from the outer annular groove and perform disassembling of the actuator. More specifically this flare angle is defined so as to perform the disassembly with a force exerted by hand operator puller tools.

It should be noted that the dimensions of the actuator, diameters, radius, flare angles, elasticity of the blocking part 8 and the materials of the actuator parts can be adapted/selected so as to ease assembling of the actuator by the operator.

It should be noted that the dimensions of the actuator, diameters, radius, flare angles, elasticity of the blocking part 8 and the materials of the actuator parts can be adapted/selected so as to either reduce or increase the difficulty of disassembling the actuator by the operator.

These features are designed to maintain their performances over various cycles even though the assembly is generally only assembled a few times in its working life time.

Finally, it should be observed that the second shoulder 10 presents a diameter R2 less than an inner diameter R6 of the cylinder in order to enable the seat 4 to be centered and/or guided in the cylinder 2.

Finally, the inside of the seat 4 is tapped about the axis X-X in order to enable screw-thread engagement with a complementary tool used for forcing the seat 4 to move inside the cylinder 2 in order to assemble or disassemble the actuator 1.

Figure 7:
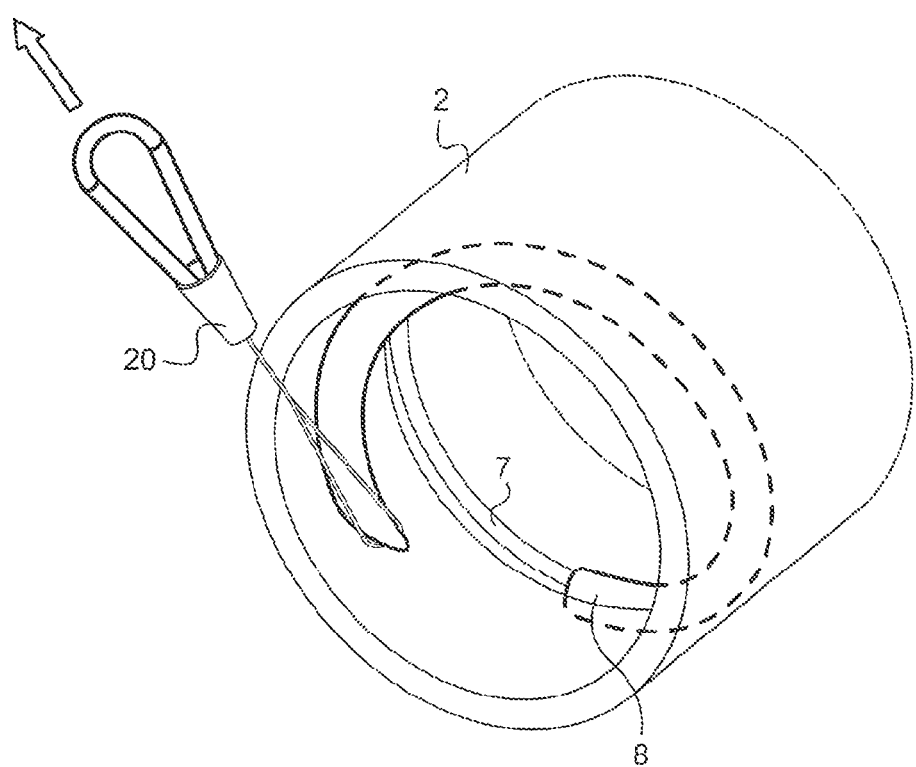
FIG. 7 is perspective view of the resilient ring 8 while it is being withdrawn from the inner annular groove 7 of cylinder 2 using a manual tool 20 comprising a loop or a hook conformed so as to hold on an extremity of the ring 8.

As illustrated by FIG. 7, the blocking part 8 end is designed to be simple to fabricate and easy to extract from the cylinder 2 using a wire of a manual tool 20 or a flat screwdriver. In the present case, the end of the blocking part is beveled with a distal end of the beveled part closer to the inner diameter of the blocking part 8 than the external diameter of the blocking part 8.

The invention claimed is:

1. A linear telescopic actuator (1) comprising:
   a cylinder (2);
   a sliding part (3) extending at least in part inside the cylinder (2) in order to slide therein along a sliding axis (X-X');
   a spring seat (4) that is arranged at least in part inside the cylinder (2); and
   at least a first compression spring (5) arranged inside the cylinder (2) between said sliding part (3) and the spring seat (4) in order to be capable of resiliently opposing the sliding part (3) approaching the spring seat (4), the actuator being characterized in that:
   the spring seat (4) presents an outer annular groove (6) and the cylinder (2) includes an inner annular groove (7), the actuator (1) further presenting a blocking part (8), the actuator (1) being adapted to adopt selectively an assembled configuration and a disassembled configuration, the blocking part (8) in the assembled configuration being engaged inside the inner and outer annular grooves (6, 7) and forming an obstacle opposing sliding of the spring seat (4) relative to the cylinder (2), and the blocking part (8) in the disassembled configuration being disengaged from at least one of the inner and outer annular grooves (7, 6) in order to allow the spring seat (4) to slide relative to the cylinder (2), the blocking part (8) and the inner and outer annular grooves (7, 6) being adapted:

A) to allow the actuator to pass from its assembled configuration to its disassembled configuration when a first force (F1) is exerted on the spring seat (4) along said sliding axis (X-X) in a first direction (S1) going from the spring seat (4) towards the spring (5), this first force (F1) presenting a first magnitude greater than a predetermined minimum threshold; and B) to prevent the actuator from passing from its assembled configuration to its disassembled configuration:
      when a force is exerted on the spring seat (4) in said first direction (S1) with a magnitude less than or equal to the predetermined minimum threshold; or
      when a force (F2) is exerted on the spring seat (4) in a second direction (S2) opposite to said first direction (S1).

2. The actuator according to claim 1, wherein the blocking part (8) is an open resilient ring adapted under the action of said first force (F1) to disengage from the outer annular groove (6) of the spring seat by moving towards the inside of the inner annular groove (7) of the cylinder (2) in such a manner as to allow the spring seat (4) to move relative to said cylinder (2) in said first direction (S1).

3. The actuator according to claim 2, wherein the outer annular groove (6) of the spring seat (4) presents first and second shoulders (9, 10) arranged to be on either side of the blocking part (8) when the actuator (1) is in the assembled configuration, the first shoulder (9) being arranged to oppose any movement of the spring seat (4) relative to the cylinder (2) in the first direction (S1), and the second shoulder (10) being arranged to oppose any movement of the spring seat (4) relative to the cylinder (2) in the second direction (S2), the outer annular groove (6) of the spring seat (4) presenting:
   a first outer radius of length R1 measured at its first shoulder; and
   a minimum outer radius of length Rmin measured between the first and second shoulders (9, 10);
   the inner annular groove (7) of the cylinder (2), the outer annular groove (6) of the spring seat (4), and the blocking part (8) being dimensioned so that then the actuator (1) is in the assembled configuration, the blocking part (8) is spaced apart from the bottom of the inner annular groove (7) of the cylinder by a distance Dx greater than the difference R1−Rmin.

4. The actuator according to claim 3, wherein the blocking part (8) is in the form of an open ring that is circular in section when observed in a radial section plane, the circular section being uniform over a major portion of the length of the open ring and presenting a radius R3, the outer annular groove (6) of the spring seat (4) presenting a second outer radius of length R2 measured at its second shoulder (10), the radius R3 being less than or equal to the difference R2−Rmin.

5. The actuator according to claim 4, wherein the blocking part (8) in the form of an open ring is resilient so as to exert a resilient force against the outer annular groove (6) of the spring seat (4) opposing any passage of the actuator (1) from its assembled configuration to its disassembled configuration.

6. The actuator according to claim 5, wherein a first end of the spring seat (4) presents an annular chamfer (13) designed to guide the blocking part (8) in the form of an open ring around the spring seat (4) while said spring seat (4) is displaced so as to bring the blocking part (8) closer to the outer annular groove (6) of the spring seat (4) while the blocking part (8) is in contact with the annular chamfer (13).

7. The actuator according to claim 6, wherein, said annular chamfer (13) and said blocking part (8) are designed so that the displacement of the spring seat (4) so as to bring the blocking part (8) closer to the outer annular groove (6) of the spring seat (4) can be achieved by applying an axial displacement force (F0) on the spring seat (4) which is inferior to 200 Newton.

8. The actuator according to claim 6, wherein a side of the annular grove (6) adjacent to the first annular chamfer (13) is formed by a second annular chamfer (14), said second annular chamfer (14) being designed to guide the blocking part (8) in the form of an open ring around the spring seat (4) while said spring seat (4) is displaced so as to move the blocking part (8) away from the outer annular groove (6) of the spring seat (4) while the blocking part (8) is in contact with said second annular chamfer (14).

9. The actuator according to claim 8, wherein, said second annular chamfer (14) a said blocking part (8) are designed so that the displacement of the spring seat (4) so as to move the blocking part (8) away from the outer annular groove (6) of the spring seat (4) can be achieved by exerting said first force (F1) on the spring seat (4) along said sliding axis (X-X) in a first direction (S1).

10. An aircraft, characterized in that it includes an actuator according to claim 1.

\* \* \* \* \*